(12) United States Patent
Schallenberg

(10) Patent No.: US 6,274,637 B1
(45) Date of Patent: *Aug. 14, 2001

(54) PLASTIC RECYCLING PROCESS AND PROCESS FOR PRODUCING PLASTIC MATERIALS

(75) Inventor: Günter Schallenberg, Baesweiler (DE)

(73) Assignee: Finacor Anstalt, Vaduz (LI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,428
(22) PCT Filed: Jun. 10, 1997
(86) PCT No.: PCT/EP97/03002
§ 371 Date: Mar. 2, 1999
§ 102(e) Date: Mar. 2, 1999
(87) PCT Pub. No.: WO97/48761
PCT Pub. Date: Dec. 24, 1997

(30) Foreign Application Priority Data

Jun. 17, 1996 (DE) .............................. 196 25 110

(51) Int. Cl.⁷ .................................................. C08J 11/04
(52) U.S. Cl. ................................ 521/40; 521/41; 521/46; 521/48
(58) Field of Search ............................... 521/40.5, 40, 41, 521/46, 48; 264/37.26, 37.27, 37.32, 37.33, 40.6; 524/13, 32

(56) References Cited

U.S. PATENT DOCUMENTS

| | | | |
|---|---|---|---|
| 3,795,633 | * 3/1974 | Golovoy et al. | 260/2.3 |
| 5,026,512 | * 6/1991 | Chang | 264/40.6 |
| 5,075,057 | * 12/1991 | Hoedl | 264/115 |
| 5,428,093 | * 6/1995 | Lee | 524/317 |
| 5,488,080 | 1/1996 | Osborn . | |
| 5,643,985 | * 7/1997 | Hoffmann et al. | 524/291 |
| 5,789,477 | * 8/1998 | Nosker et al. | 524/494 |
| 5,801,204 | * 9/1998 | Johansson et al. | 521/41 |
| 6,017,970 | * 1/2000 | Chen | 521/41 |

FOREIGN PATENT DOCUMENTS

| | | |
|---|---|---|
| 130 863 | 5/1978 | (DE) . |
| 3715646 A1 | 11/1988 | (DE) . |
| 4333670 | 11/1992 | (JP) . |
| 10017672 | * 1/1998 | (JP) . |
| WO92/15640 | 9/1992 | (WO) . |
| WO94/07946 | 4/1994 | (WO) . |

OTHER PUBLICATIONS

Anton Junbauer, "Recycling von Kunststoffen," p. 40.

* cited by examiner

Primary Examiner—Edward J. Cain
Assistant Examiner—Katarzyna Wyrozebski-Lee
(74) Attorney, Agent, or Firm—Jeffrey S. Melcher; Manelli Denison & Selter, Pllc

(57) ABSTRACT

The invention comprises a process for the recycling and production of plastics, plastics mixtures and plastics materials, using new, reprocessed or used plastics and plastics mixtures or sorted and unsorted plastics wastes, in which a) a carrier material A, which comprises a newly produced plastics material or plastics waste material containing a uniform type-pure plastic or plastics of various types, a material of any or unknown composition X and an additional component Z selected from fatty acids, mixtures containing fatty acid of natural or synthetic origin, fatty acid derivatives which release fatty acid under the process conditions and fatty alcohols are mixed together, A and X together containing, relative to the volume, at least a quantity of plastics such that the non-plastics components are incorporated therein while a homogeneous or partially homogeneous composition is still forming, b) this mixture is conveyed through a conveying device with constant mechanical mixing, kneading or compression, and is subjected along the transport path to a sectional multistage thermal treatment, the temperatures in the various stages lying in each case independently of one another in a range from 60° C. to 400° C., and c) the thermally treated mixture is discharged via a nozzle for further treatment or for shaping.

31 Claims, No Drawings

PLASTIC RECYCLING PROCESS AND PROCESS FOR PRODUCING PLASTIC MATERIALS

The patent application relates to a process for the recycling and/or production of plastics or new plastics mixtures and materials using new, reprocessed or used plastics and plastics mixtures and sorted and unsorted plastics wastes, in which the degree of grade purity and type identity of the plastics is not predetermined.

Of the large quantities of plastics of many different types produced each year, much, after being used in each case for the intended purpose, is finally dumped on landfill sites, thermally disposed of in refuse incinerators and therefore removed from the material cycle. The circumstances appear to be similar in the case of other materials. In the process, a large quantity of valuable, reusable materials is also lost.

The production and utilization of so-called materials from waste products has been on the increase for quite a long time. For example, in many places separate collection and/or sorting of different waste materials is advocated and carried out, since the reprocessing and recovery of the valuable materials contained therein or the production of materials obtainable therefrom is cheaper than with refuse or waste mixtures of random composition. The upshot is that the household and industrial refuse produced daily can be seen as "raw material", but in individual cases the lack of type purity entails considerable problems. This is particularly true for plastics recycling.

Up to now it has been impossible to utilize mixed plastics wastes as materials if the differences in the plastics exceed a certain degree (see A. Jungbauer, Recycling von Kunststoffen, 1st Edition, Würzburg, Vogel-Verlag, 1994, in particular p. 40 et seq.). For this reason, it has been essential up to now to separate mixed plastics fractions cleanly into the respective grade- and type-pure plastics and then forward these sorted fractions to the respective recycling processes suitable for them. At most, mixtures of identical or very similar plastics materials have been tolerable. Such refuse sorting, in particular plastics refuse sorting, is labour- and cost-intensive however, with the result that the recycling processes or the products produced using the materials obtained in each case are comparatively expensive. The sorting of plastics wastes in household and industrial refuse is known to be problematical, and feasible only with difficulty or to a limited degree.

The composition of the plastics wastes in household and industrial refuse is extremely variable and can consist of several dozens of different plastic types and grades, the current state of knowledge indicating that the composition of the plastics wastes can be wholly different from region to region. It is assumed that on average the following types of plastics are found:

| | |
|---|---|
| Polyethylene (LDPE, MDPE and HDPE) | ca 30% |
| Polypropylene PP | ca 10% |
| Polyvinyl chloride (PVC) | ca 15% |
| Polystyrenes (PS, EPS, ABS, ASA) | ca 15% |
| Polyamide (PA 6, PA 6, 6 etc) | ca 10% |
| Other industrial thermoplasts | ca 10% |
| Thermosets and composites | ca 10% |

All of these are seriously contaminated by dye residues, paper, adhesive residues, coatings and other substances. The separation of such complex mixtures is often impossible even if the cost is reasonable.

Up to now, however, cleanness and type and grade purity have been essential for a high-grade recycling of these plastics. Mixed plastics wastes can be used to a limited extent only in low-grade applications. However, as explained above, any mixing of plastics types makes processing into high-quality products difficult and expensive or even impossible. Mixing with particular plastic types such as for example PVC actually makes recycling almost impossible.

It was therefore the object of the invention to provide a possibility of reprocessing, and in particular a process for recycling and utilizing, mixtures containing plastics waste or for utilizing newly produced plastics and preferably simultaneously a process for producing a new material using such newly produced or used plastics, in which grade purity and type purity of the plastics is not necessary and yet high-quality materials and products can be produced. This recycling process is also to be considerably cheaper than the previous processes and simultaneously also be able to include the simultaneous utilization of other waste materials.

This object is achieved according to the invention by a process for the production of a material from mixtures which comprise newly produced plastics material or plastics waste material (i.e. using new plastics or recycling used or other waste plastics), in which a) a carrier material A, which comprises a newly produced plastics material or plastics waste material containing a uniform type-pure plastic or plastics of various types, a material of any or unknown composition X and an additional component Z selected from fatty acids, mixtures containing fatty acid, fatty acid derivatives which release fatty acid under the process conditions and fatty alcohols are mixed together, A and X together containing, relative to the volume, at least a quantity of plastics such that the non-plastics components are incorporated therein while a homogeneous or partially homogeneous composition is still forming, b) this mixture is conveyed through a conveying device with constant mechanical mixing, kneading or compression, and is subjected along the transport path to a sectional multistage thermal treatment, the temperatures in the various stages lying in each case independently of one another in a range from 60° C. to 400° C., and c) the thermally treated mixture is discharged via a nozzle for further treatment or for shaping.

Preferred embodiments are the subject of the sub-claims.

When the process according to the invention is used, it is surprisingly possible to process waste and refuse which contains several different and even considerably different kinds and types of plastics. Furthermore, the plastics compositions produced can unexpectedly be processed into high-quality products, and the quality and the resulting useful life achieved when using recycled plastics, as against when using newly produced plastics, can now surprisingly be increased to ca 80% and more instead of the previous ca 30 to 35%.

This recycling and production process makes it possible in particular for plastics and plastics grades of all types of plastics (thermoplasts, thermosets, elastomers and others), some of which according to current knowledge are considered to be non-recyclable, non-remeltable, incompatible with each other when mixed, and not homogeneously miscible, to form a homogeneous or partially homogeneous composition by thermal-mechanical treatment during processing and through the use of an admixed additional component.

The incompatibilities occurring hitherto in the known processes between the different plastics (e.g. PVC in any combination, PS/PE, PE/PP, PA/PE) and the decomposition or combustion of the obtained plastic compositions on heating are overcome by the process according to the invention. What is particularly noteworthy is that the various plastics can be processed unsorted (not type-pure), i.e. together.

Moreover, many other waste materials such as for example rubber, carpets and floor coverings, wood wastes, glass fibre wastes, waste paper etc can be added to the process as an additional constituent of the material of any or unknown composition X and be disposed of without the effectiveness of the process being detrimentally impaired. An important contribution is therefore made overall to the avoidance of refuse that has to be dumped on landfill sites and to be burned in incinerators.

Thus, in the process according to the invention, uncleaned plastics up to a certain degree of contamination and non-plastics materials up to a certain proportion of the total volume can be processed, added and incorporated into the resulting plastics mixtures or mixtures of plastics and non-plastics materials, this mixture together with the additional component of natural biological or synthetic origin forming a compound which is homogeneous or restrictedly, i.e. partially, homogeneous, depending on the respective proportion and type of materials present.

In selecting the material used in the process according to the invention, the only requirement to be met is that the material mixture to be subjected to temperature treatment consisting of A and X together contains, relative to the volume, at least a quantity of plastics such that the non-plastics components are incorporated therein while a homogeneous or partially homogeneous composition is still forming, the plastics content therein comprising preferably at least 10, more preferably 25, in particular 40 and most preferably at least 50 vol. % plastics, which proportion can according to the invention in turn be made up of different plastics fractions.

The carrier material A preferably comprises a component which contains plastics selected from thermoplasts, thermosets and/or elastomers, composites and RIM plastics which contain such plastics also being included.

According to preferred embodiments of the invention, the plastics material comprises one or more plastics selected from acrylonitrile/butadiene/styrene polymers (ABS), polyethylenes (PE) including high-, medium- and low-density polyethylene (PE), polycarbonates (PC), polytetrafluoroethylenes (PTFE), polyethylene terephthalates (PET), ethylene/vinyl acetate polymers (EVA), polymethylenes (PMMA), polyoxymethylenes (PEM), styrene/acrylonitrile polymers (SAN), polystyrenes (PS, EPS, ASA), polyamides (PA), polypropylenes (PP), polyvinyl chlorides (PVC) and polyurethanes (PUR) and in particular polyethylene (PE) and/or polypropylene (PP).

The plastics-containing carrier material A can for example comprise carpet remnants and/or textile remnants which consist wholly or partly of plastics.

In addition to the plastics component, the carrier material A can contain, relative to the volume, up to 10% and in particular up to 5% of other material as contaminant. During the formation of the mixture according to the invention that is to be subjected to a multistage thermal treatment, care must then be taken that the material of any or unknown composition X for its part contains so much plastics that overall the necessary quantity, most preferably at least 50 vol. %, of plastics is present. The other material can for example be selected from rubber and caoutchouc materials, floor coverings of all kinds, glass and glass fibres, metal, paper, wood and wood residues, in particular sawdust, wool and sand.

According to preferred embodiments, the carrier material A is presorted, and the proportion of plastics-containing component in the carrier material A, relative to the volume, is fixed in this way at 90 to 100%.

If the carrier material A contains 100% plastics, attention need not be paid to the composition, i.e. to a particular plastics content, of the material of any or unknown composition X if 50 vol. % of carrier material A are already being used. The fraction separated in the presorting can be, and preferably is, in turn used as a material of any or unknown composition X, so that a 100% exploitation of the plastics refuse results.

The carrier material A and the material of any or unknown composition X are, relative to the volume, mixed with each other in any ratio, e.g. 1:50 to 50:1, preferably 1:10 to 10:1 and in particular 1:5 to 5:1, attention needing to be paid to the maintenance of the presence of a sufficient minimum plastics content, such as for example a minimum plastics content in the mixture of 10, 25, 40 or 50 vol. %. The materials A and X are preferably mixed with each other in the ratio of 50:50, the carrier material A then preferably comprising no material other than plastics. Should it, however, contain other material, the proportion of carrier material A in the total mixture is to be increased, or attention must be paid to the presence of a plastics fraction in the material of any or unknown composition.

The material of any or unknown composition X can be any material, and only in the case where the carrier material A does not consist 100% of plastics need it be ensured that the plastics content necessary to achieve a sufficient proportion of plastics in the total mixture is achieved. Suitable as material of any or unknown composition X are plastics-containing waste material which is different from the plastics-containing component of carrier material A, household refuse, bulky refuse, paper and cardboard, in particular waste paper, coated cardboard and coated waste paper, landfill refuse, metal, wood and wood residues, in particular sawdust, rubber materials and glass fibres. This list is not however to be considered to be limitative.

The carrier material A and the material of any or unknown composition X are optionally comminuted prior to mixing, e.g. are shredded, cut and/or finely ground, in order to thus facilitate and to guarantee a more intimate and more thorough mixing of the two components prior to the thermal treatment. The materials A and X can each be stockpiled separately before mixing, for example in storage containers such as a storage silo, and can be mixed on site, i.e. before being introduced into the device for thermal treatment. Alternatively, a premix can be prepared and stockpiled and is then fed to the device for thermal treatment. The materials can be prepared and made ready for example by using known sorting machines.

The additional component Z, which is selected from fatty acid(s), mixtures containing fatty acid, fatty acid derivatives which release fatty acid under the process conditions and fatty alcohols, is preferably added to the mixture of carrier material A and material of any or unknown composition X before the mechanical/thermal treatment.

The expression "fatty acid" is to be taken to include any aliphatic carboxylic acids, preferably the aliphatic $C_1$ to $C_{50}$ carboxylic acids which can be unbranched, branched, saturated or unsaturated (alkane, alkene and alkyne carboxylic acids). Also included are any mixtures of such fatty acids. Examples of unbranched saturated alkane carboxylic acids are formic acid, acetic acid, propionic acid, butyric acid, valeric acid, caproic acid, heptanoic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid, behenic acid, lignoceric acid and melissic acid. Examples of branched saturated alkane carboxylic acids are isobutyric acid, isovaleric acid and tuberculostearic acid. Examples of unbranched singly unsaturated alkene carboxylic acids are crotonic acid, palmitoleic acid, oleic acid and erucic acid. Examples of unbranched doubly unsaturated alkene carboxylic acids are sorbic acid and linoleic acid. Examples of unbranched triply unsaturated alkene carboxylic acids are linolenic acid and elaeostearic acid. An example of unbranched four-times unsaturated alkene carboxylic acids is arachidonic acid. An example of unbranched five-times unsaturated alkene carboxylic acids is clupanodonic acid. An example of unbranched six-times unsaturated alkene carboxylic acids is docoshexanoic acid They can for example be recovered from fermentation products, yeasts, animal and vegetable fats or products obtained therefrom such as milk fat, butter, coconut oil, calamus oil, palm oil, peanut oil, rapeseed oil, cacao oil, carnauba wax, beeswax, lanolin, soybean oil, maize oil, croton oil, grapeseed oil, mountain ash oil, beef tallow and fish oil, or used in this form. The corresponding fatty acid derivatives and fatty alcohols are likewise included according to the invention.

The fatty acids and fatty alcohols can therefore be saturated, singly or multiply unsaturated compounds which can be obtained or produced from oil-yielding plants and other plant and animal products.

The additional component is preferably unsaturated, and the higher the degree of unsaturation of the fatty acid, the more it is preferred.

Suitable and preferred as additional component Z are for example linseed oil and/or maize oil.

The addition of this additional component surprisingly results in an improved temperature stability of the mixture during thermal treatment, going well beyond the temperature stability which is achieved without the additional component. The additional component also acts as a compatibility promoter and binder. It is added, relative to the volume of the mixture of A and X, in a quantity of 0.01 to 10%, in particular 0.1 to 5% and preferably 0.3 to 3%. Larger quantities are possible but generally unnecessary.

Exactly as with conventional processes, process and function additives can also be used according to the invention without any problems, in order to meet the various property requirements (also of the products).

The thermal and mechanical treatment of the mixtures according to the invention during processing possibly brings about through the interaction with the additional component in the plastics present in the mixture a chemical and/or physical reaction by which the different plastics are combined homogeneously or at least partially homogeneously with one another. The substances which do not combine homogeneously or partially homogeneously in this process are so changed in their shape and size by mechanical action during processing that they are bound completely or at least to a large extent in the forming plastics material.

The mixing together of the carrier material A, the material of any or unknown composition X and the additional component Z takes place for example in a mixer or mixing unit.

According to a preferred embodiment of the process according to the invention, the multistage thermal treatment of the mixture obtained in this way comprises three stages, in which the temperature in i) the first stage is 60 to 130° C., in particular 80 to 120° C. and preferably 90 to 120° C., e.g. 100° C., ii) the second stage is 130 to 180° C., in particular 140 to 170° C. and preferably 140 to 160° C., and iii) the third stage is 160 to 380° C., in particular 170 to 320° C. and preferably 180 to 280° C.

According to another preferred embodiment of the process according to the invention, the multistage thermal treatment takes place in four stages, in which the temperature in i) the first stage is 60 to 120° C., in particular 80 to 110° C. and preferably 100° C., ii) the second stage is 120 to 160° C., in particular 130 to 160° C. and preferably 140 to 160° C., iii) the third stage is 160 to 220° C., in particular 160 to 210° C. and preferably 160 to 200° C., and iv) the fourth stage is 180 to 380° C., in particular 200 to 300° C. and preferably 220 to 280° C.

More stages, for example, may also be provided. Therefore, 5 to 12 stages are also suitable.

The multistage thermal treatment takes place for example in a known injection machine or an extruder (see A. Jungbauer, Recycling von Kunststoffen, 1st Edition, Würzburg, Vogel-Verlag, 1994, in particular p. 40 et seq.), the material mixture being advanced along a path, e.g. a screw path, with constant mechanical mixing, kneading or compression. The transport path is divided into sections which differ in their temperature, in which the different temperatures in each case independently of one another range from 60° C. to 380° C. and can be for example as above for the exemplary three-stage or four-stage process. Some examples are given below which illustrate a suitable temperature programme. It can, however, be varied within the above-stated ranges depending on the material used.

EXAMPLES 1 to 8

|  |  | Ex. 1 | Ex. 2 | Ex. 3 | Ex. 4 |
|---|---|---|---|---|---|
| Temperature of composition (in ° C.) (Extruder) | Zone 1 | 100 | 100 | 100 | 100 |
|  | Zone 2 | 140 | 160 | 160 | 160 |
|  | Zone 3 | 160 | 180 | 180 | 200 |
|  | Zone 4 | 180 | 200 | 220 | 280 |
|  |  | Ex. 5 | Ex. 6 | Ex. 7 | Ex. 8 |
| Temperature of composition (in ° C.) Injection machine | Zone 1 | 100 | 100 | 100 | 100 |
|  | Zone 2 | 140 | 160 | 160 | 160 |
|  | Zone 3 | 160 | 180 | 180 | 200 |
|  | Nozzle | 140 | 140 | 160 | 160 |

The grain size of the material fed into the respective device for thermal treatment is preferably 0.1 to 5 mm, in particular 0.5 to 5 and more preferably 1 to 5 mm in diameter. The choice of the respective zone temperature depends for example on the grain size and the composition of the material mixture used and can be adapted within the prescribed ranges to the material mixture to be processed in each case.

The thermal treatment takes place preferably in an injection machine or an extruder.

The material, which is discharged for example from the nozzle of an injection machine or an extruder after it has been thermally treated therein, can be shaped immediately afterwards and left to cool. Alternatively, shaping can take place later, in which case the plastics composition can be initially heated up again if necessary to the point where it can be made into the desired shape.

A device suitable for implementing the process according to the invention is for example an injection moulding machine from Storck, e.g. model ST 1600-330, an injection moulding machine from Battenfeld, model BC-T and an injection moulding machine from Dr.-Ing. Sommer, model DS variant 16-2033.

Any other appropriate devices are, however, also suitable provided that they allow the mechanical/thermal treatment necessary according to the invention.

The material discharged after thermal treatment can be compressed, injection-moulded, expanded or extruded and can assume any desired shape. For example, dimensionally stable or flexible products such as sheets, films, rods, posts, beams, tubes, hoses, lagging, lining or insulating elements, casings, visual and thermal protection elements and elements for protection against mechanical damage, preshaped parts for cavity filling, construction elements, bricks, supporting elements, roofing tiles, tool parts or connecting elements, paving stones and the like can be formed. This list is not to be considered limitative.

The products manufactured using the plastics material produced according to the invention are high-quality products, the production costs being considerably less than for comparable products from newly produced plastics/plastics produced for the first time or from type-pure plastics (after recycling thereof), being products produced in each case from single material. A price saving of for example up to 50%, in individual cases even more, is possible.

The properties of an industrial floor covering produced according to the invention which has been produced from cable wastes, flexible PVC, PE and 5% rubber granules are given below. The data show that the material fulfils the requirements set for such a product.

| | |
|---|---|
| 1. Area weight according to DIN 53352 | 14.35 kg/m$^2$ |
| 2. Density according to DIN 53479 | 1.49 g/cm$^3$ |
| 3. Tensile strength according to DIN 53455 | 8.75 N/mm$^2$ |
| 4. Elongation at break according to DIN 53455 | 70% |
| 5. Notch impact resistance according to DIN 53453 | 17.73 J/cm$^2$ |
| 6. Dimensional change when exposed to heat, based on DIN 51962 | |
| Hot storage over 6 hrs at 80° C. | No change in shape |
| measured at 120° C. over 6 hours | max. 0.29% |
| 7. Combustibility according to DIN 51960 | Class 1 (difficult to ignite) |
| 8. Behaviour when exposed to burner flame according to DIN 53438 | Class F1/9.8 mm |
| 9. Slip properties, based on DIN 53375 | |
| Shoe-sole leather | $\mu = 0.53$ |
| Rubber shoe sole | $\mu = 0.70$ |
| PUR/PVC shoe sole | $\mu = 0.68$ |
| 10. Ball pressure hardness according to DIN 53456 | |
| On loading with the main load 49.03 N | |
| after 20 min. elastic re-formation | 41% |
| after 40 min. elastic re-formation | 48% |
| Ball pressure hardness | 6.4 N/mm$^2$ |
| Complete re-blending after 4 hrs | |
| 11. Rebound elasticity at 0.5 Nm impact energy | 15% |
| 12. Thermal conductivity, based on DIN 52612 | |
| Temperature increase from 20 to 40° C. in | 20 min. |
| 13. Chemico-physical action of test reagents according to DIN 51958 | |
| Sodium hydroxide solution 1% | stable |
| Sodium hydroxide solution 10% | stable |
| Sodium hydroxide solution 15% | stable |
| Nitric acid 10% | stable |
| Nitric acid 30% | partly stable |
| Hydrochloric acid 10% | stable |
| Sulphuric acid 3% | stable |
| Sulphuric acid 30% | stable |
| Acetic acid 5% | partly stable |
| Mineral oil SAE20W/50 | stable |

The material of any or unknown composition X can also be a pure material or can contain different plastics or non-plastics components in any or in approximately equal parts.

The following in particular come into consideration as material X, alone or in the form of any mixtures thereof, in which case however it is different from carrier material A or contaminated by in some cases unknown substances: PVC (flexible PVC, rigid PVC, e.g. carpet remnants), HDPE, LDPE, PP, PA (PA6 PA 6,6, Pa 11, PA 12, PA GV 30 H), PMMA, POM, PUR (e.g. elastomers and foams), ABS, SAN, PS, PC, TPE (thermoplastic polymers), PE/PA mixtures, fibre carpet remnants, sawdust, food packaging made of plastics, plastics-coated paper or plastics-coated cardboard, plastics carrier bags (e.g. so-called plastic bags) and PPO (polyphenylene oxide).

9 specimen sheets were produced measuring 15 cm×15 cm×0.5 cm and containing, as carrier material A, the plastics given in the following table, one or more of the materials, also given, of any or unknown composition X and 5% linseed oil as additional component. The quantities given relate to the volume of the total mixture.

Sheet 1:10% HDPE (high-density polyethylene), 90% sawdust
Sheet 2:25% HDPE, 75% sawdust
Sheet 3:50% PP, 50% of a mixture M of all of the materials named above in paragraph 2 (approximately equal proportions)
Sheet 4:30% HDPE+20% ABS, 50% of mixture M
Sheet 5:50% HDPE, 50% of mixture M
Sheet 6:25% PE+25% PA, 50% of mixture M
Sheet 7:10% HDPE+20% LDPE (low-density polyethylene)+20% SAN, 50% of mixture M
Sheet 8:25% PP+25% ABS/SAN, 50% of mixture M
Sheet 9:30% PP+20% ABS/Pa, 50% of mixture M

What is claimed is:

1. Process for recycling waste plastic comprising at least two different plastic materials, the method comprising:
    (a) combining a carrier material A comprising a plastic material and up to 10% by volume of contaminants and a second material X in a ratio A:X of from 1:50 to 50:1, a plastics content of the mixture of A and X being at least 50% by volume, wherein said material X is selected from the group consisting of plastics-containing waste material which is different from the plastics-containing carrier material A, household refuse, bulky refuse, paper, cardboard, plastics-coated cardboard, plastics-coated waste paper, landfill refuse, metal, wood, wood residues, sawdust, rubber, and glass fibers;
    (b) combining the mixture of A and X with an additional component Z which is selected from the group consisting of fatty acids, mixtures containing fatty acid of natural or synthetic origin, fatty acid derivatives which release fatty acid under process conditions in step (d) and fatty alcohols, to form a mixture of plastics, wherein the additional component Z is added, relative to the volume of the mixture of A and X, in a quantity of 0.01 to 10%;

(c) forming the mixture of plastics into granular beads of 1 to 5 mm in diameter (d) conveying the granular beads through a conveying device with mechanical mixing, kneading or compression, subjecting along a transport path to a sectional multistage thermal treatment, the multistage thermal treatment comprising three stages, the temperature being in
   i) a first stage 60 to 130° C.,
   ii) a second stage, 130 to 180° C., and
   iii) a third stage, 160 to 380° C., to form a thermally treated mixture; and (e) discharging the thermally treated mixture via a nozzle for further treatment or for shaping.

2. Process according to claim 1, wherein the carrier material A comprises a component which contains a plastic selected from the group consisting of thermoplasts, thermosets, elastomers, and composites and RIM plastics containing thermoplasts, thermosets or elastomers.

3. Process according to claim 2, wherein the plastic is selected from the group consisting of acrylonitrile/butadiene/styrene polymers, polyethylenes, polycarbonates, polytetrafluoroethylene, polyethylene terephthalates, ethylene/vinyl acetate polymers, polymethylenes, polyoxymethylenes, styrene/acrylonitrile polymers, polystyrenes, polyamides, polypropylenes, polyvinyl chlorides and polyurethanes.

4. Process according to claim 3, wherein the plastic comprises polyethylene and/or polypropylene.

5. Process according to claim 1, wherein the carrier material A comprises carpet remnants and/or textile remnants.

6. Process according to claim 1, wherein the carrier material A contains up to 5% by volume of contaminants.

7. Process according to claim 1, wherein the contaminate is selected from rubber, floor coverings, glass and glass fibres, paper, wood and wood residues, sawdust, wool and sand.

8. Process according to claim 1, further comprising presorting the carrier material A to fix the proportion of plastic in the carrier material A at 90 to 100% by volume.

9. Process according to claims 8, wherein a sorted fraction is used as a material X.

10. Process according to claim 1, wherein the carrier material A and the material X are comminuted prior to mixing.

11. Process according to claim 1, wherein the carrier material A and the material X are stockpiled optionally after presorting, after comminution and before mixing.

12. Process according to one claim 1, characterized in that the carrier material A and the material X are mixed with each other in the ratio of 50:50 by volume.

13. Process according to claim 12, wherein the carrier material A contains no other material apart from the plastic material.

14. Process according to claim 1, wherein the multistage thermal treatment comprises three stages, in which the temperature in
   i) the first stage is 80 to 120° C.,
   ii) the second stage is 140 to 170° C., and
   iii) the third stage is 170 to 320° C.

15. Process according to claim 1, wherein the multistage thermal treatment comprises three stages, in which the temperature in
   i) the first stage is 90 to 120° C.,
   ii) the second stage is 140 to 160° C., and
   iii) the third stage is 180 to 280° C.

16. Process according to claim 1, wherein the multistage thermal treatment comprises four stages, in which the temperature in
   i) the first stage is 60 to 120° C.,
   ii) the second stage is 120 to 160° C.,
   iii) the third stage is 160 to 220° C., and
   iv) the fourth stage is 180 to 380° C.

17. Process according to claim 16, wherein the multistage thermal treatment comprises four stages, in which the temperature in
   i) the first stage is 80 to 110° C.,
   ii) the second stage is 130 to 160° C.,
   iii) the third stage is 160 to 210° C., and
   iv) the fourth stage is 200 to 300° C.

18. Process according to claim 17, wherein the multistage thermal treatment comprises four stages, in which the temperature in
   i) the first stage is 100° C.,
   ii) the second stage is 140 to 160° C.,
   iii) the third stage is 160 to 200° C., and
   iv) the fourth stage is 220 to 280° C.

19. Process according to claim 1, the mixing together of the carrier material A, the material X and the additional component Z takes place in a mixer or mixing unit and/or the conveying and the temperature treatment take place in an injection machine or an extruder.

20. Process according to claim 1, wherein the additional component Z is added, relative to the volume of the mixture of A and X, in a quantity of 0.1 to 5%.

21. Process according to claim 20, wherein the additional component Z is added, relative to the volume of the mixture A and X, in a quantity of 0.3 to 3%.

22. Process according to claim 1, wherein the additional component Z comprises linseed oil and/or maize oil.

23. Process according to claim 1, wherein the mixing and the thermal treatment take place in an injection machine or an extruder.

24. Process according to claim 1, wherein the thermally treated mixture discharged from the nozzle is shaped and left to cool.

25. Process according to claim 24, further comprising forming dimensionally stable or flexible sheets, films, rods, posts, beams, tubes, hoses, lagging, lining or insulating elements, casings, visual and thermal protection elements and elements for protection against mechanical damage, preshaped parts for cavity filling, construction elements, bricks, supporting elements, roofing tiles, paving stones, garden slabs, tool parts or connecting elements from the thermally treated mixture discharged from the nozzle.

26. A process for making dimensionally stable or flexible sheet, film, rod, post, beam, tube, hose, lagging, lining or insulating element, or casing, the method comprising:
   (a) combining a carrier material A comprising a plastic material and up to 10% by volume of contaminants and a second material X in a ratio A:X of from 1:50 to 50:1, a plastics content of the mixture of A and X being at least 50% by volume, wherein said material X is selected from the group consisting of plastics-containing waste material which is different from the plastics-containing carrier material A, household refuse, bulky refuse, paper, cardboard, plastics-coated cardboard, plastics-coated waste paper, landfill refuse, metal, wood, wood residues, sawdust, rubber, and glass fibers;
   (b) combining the mixture of A and X with an additional component Z which is selected from the group consisting of fatty acids, mixtures containing fatty acid of natural or synthetic origin, fatty acid derivatives which release fatty acid under process conditions in step (d) and fatty alcohols, to form a mixture of plastics, wherein the additional component Z is added, relative to the volume of the mixture of A and X, in a quantity of 0.01 to 10%;

(c) forming the mixture of plastics into granular beads of 1 to 5 mm in diameter (d) conveying the granular beads through a conveying device with mechanical mixing, kneading or compression, subjecting along a transport path to a sectional multistage thermal treatment, the multistage thermal treatment comprising three stages, the temperature being in
 i) a first stage 60 to 130° C.,
 ii) a second stage, 130 to 180° C.,
 iii) a third stage, 160 to 380° C., to form a thermally treated mixture; and (e) discharging the thermally treated mixture via a nozzle; and (f) shaping said thermally treated mixture to form a dimensionally stable or flexible sheet, film, rod, post, beam, tube, hose, lagging, lining or insulating element, or casing.

27. A process for making a construction element, brick, supporting element, roofing tile, paving stone or garden slab, the method comprising:

(a) combining a carrier material A comprising a plastic material and up to 10% by volume of contaminants and a second material X in a ratio A:X of from 1:50 to 50:1, a plastics content of the mixture of A and X being at least 50% by volume, wherein said material X is selected from the group consisting of plastics-containing waste material which is different from the plastics-containing carrier material A, household refuse, bulky refuse, paper, cardboard, plastics-coated cardboard, plastics-coated waste paper, landfill refuse, metal, wood, wood residues, sawdust, rubber, and glass fibers;

(b) combining the mixture of A and X with an additional component Z which is selected from the group consisting of fatty acids, mixtures containing fatty acid of natural or synthetic origin, fatty acid derivatives which release fatty acid under process conditions in step (d) and fatty alcohols, to form a mixture of plastics, wherein the additional component Z is added, relative to the volume of the mixture of A and X, in a quantity of 0.01 to 10%;

(c) forming the mixture of plastics into granular beads of 1 to 5 mm in diameter (d) conveying the granular beads through a conveying device with mechanical mixing, kneading or compression, subjecting along a transport path to a sectional multistage thermal treatment, the multistage thermal treatment comprising three stages, the temperature being in
 i) a first stage 60 to 130° C.,
 ii) a second stage, 130 to 180° C.,
 iii) a third stage, 160 to 380° C., to form a thermally treated mixture; and (e) discharging the thermally treated mixture via a nozzle; and (f) shaping said thermally treated mixture to form a construction element, brick, supporting element, roofing tile, paving stone or garden slab.

28. A process for making a tool part, the method comprising:

(a) combining a carrier material A comprising a plastic material and up to 10% by volume of contaminants and a second material X in a ratio A:X of from 1:50 to 50:1, a plastics content of the mixture of A and X being at least 50% by volume, wherein said material X is selected from the group consisting of plastics-containing waste material which is different from the plastics-containing carrier material A, household refuse, bulky refuse, paper, cardboard, plastics-coated cardboard, plastics-coated waste paper, landfill refuse, metal, wood, wood residues, sawdust, rubber, and glass fibers;

(b) combining the mixture of A and X with an additional component Z which is selected from the group consisting of fatty acids, mixtures containing fatty acid of natural or synthetic origin, fatty acid derivatives which release fatty acid under process conditions in step (d) and fatty alcohols, to form a mixture of plastics, wherein the additional component Z is added, relative to the volume of the mixture of A and X, in a quantity of 0.01 to 10%;

(c) forming the mixture of plastics into granular beads of 1 to 5 mm in diameter (d) conveying the granular beads through a conveying device with mechanical mixing, kneading or compression, subjecting along a transport path to a sectional multistage thermal treatment, the multistage thermal treatment comprising three stages, the temperature being in
 i) a first stage 60 to 130° C.,
 ii) a second stage, 130 to 180° C.,
 iii) a third stage, 160 to 380° C., to form a thermally treated mixture; and (e) discharging the thermally treated mixture via a nozzle; and (f) shaping said thermally treated mixture to form a tool part.

29. A dimensionally stable or flexible sheet, film, rod, post, beam, tube, hose, lagging, lining or insulating element, or casing, comprising recycled plastic formed by the method comprising:

(a) combining a carrier material A comprising a plastic material and up to 10% by volume of contaminants and a second material X in a ratio A:X of from 1:50 to 50:1, a plastics content of the mixture of A and X being at least 50% by volume, wherein said material X is selected from the group consisting of plastics-containing waste material which is different from the plastics-containing carrier material A, household refuse, bulky refuse, paper, cardboard, plastics-coated cardboard, plastics-coated waste paper, landfill refuse, metal, wood, wood residues, sawdust, rubber, and glass fibers;

(b) combining the mixture of A and X with an additional component Z which is selected from the group consisting of fatty acids, mixtures containing fatty acid of natural or synthetic origin, fatty acid derivatives which release fatty acid under process conditions in step (d) and fatty alcohols, to form a mixture of plastics, wherein the additional component Z is added, relative to the volume of the mixture of A and X, in a quantity of 0.01 to 10%;

(c) forming the mixture of plastics into granular beads of 1 to 5 mm in diameter (d) conveying the granular beads through a conveying device with mechanical mixing, kneading or compression, subjecting along a transport path to a sectional multistage thermal treatment, the multistage thermal treatment comprising three stages, the temperature being in
  i) a first stage 60 to 130° C.,
  ii) a second stage, 130 to 180° C.,
  iii) a third stage, 160 to 380° C., to form a thermally treated mixture; and (e) discharging the thermally treated mixture via a nozzle; and (f) shaping said thermally treated mixture to form a dimensionally stable or flexible sheet, film, rod, post, beam, tube, hose, lagging, lining or insulating element, or casing.

30. A construction element, brick, supporting element, roofing tile, paving stone or garden slab comprising recycled plastic formed by the method comprising:

(a) combining a carrier material A comprising a plastic material and up to 10% by volume of contaminants and a second material X in a ratio A:X of from 1:50 to 50:1, a plastics content of the mixture of A and X being at least 50% by volume, wherein said material X is selected from the group consisting of plastics-containing waste material which is different from the plastics-containing carrier material A, household refuse, bulky refuse, paper, cardboard, plastics-coated cardboard, plastics-coated waste paper, landfill refuse, metal, wood, wood residues, sawdust, rubber, and glass fibers;

(b) combining the mixture of A and X with an additional component Z which is selected from the group consisting of fatty acids, mixtures containing fatty acid of natural or synthetic origin, fatty acid derivatives which release fatty acid under process conditions in step (d) and fatty alcohols, to form a mixture of plastics, wherein the additional component Z is added, relative to the volume of the mixture of A and X, in a quantity of 0.01 to 10%;

(c) forming the mixture of plastics into granular beads of 1 to 5 mm in diameter (d) conveying the granular beads through a conveying device with mechanical mixing, kneading or compression, subjecting along a transport path to a sectional multistage thermal treatment, the multistage thermal treatment comprising three stages, the temperature being in
  i) a first stage 60 to 130° C.,
  ii) a second stage, 130 to 180° C.,
  iii) a third stage, 160 to 380° C., to form a thermally treated mixture; and (e) discharging the thermally treated mixture via a nozzle; and (f) shaping said thermally treated mixture to form a construction element, brick, supporting element, roofing tile, paving stone or garden slab.

31. A tool part comprising recycled plastic formed by the method comprising:

(a) combining a carrier material A comprising a plastic material and up to 10% by volume of contaminants and a second material X in a ratio A:X of from 1:50 to 50:1, a plastics content of the mixture of A and X being at least 50% by volume, wherein said material X is selected from the group consisting of plastics-containing waste material which is different from the plastics-containing carrier material A, household refuse, bulky refuse, paper, cardboard, plastics-coated cardboard, plastics-coated waste paper, landfill refuse, metal, wood, wood residues, sawdust, rubber, and glass fibers;

(b) combining the mixture of A and X with an additional component Z which is selected from the group consisting of fatty acids, mixtures containing fatty acid of natural or synthetic origin, fatty acid derivatives which release fatty acid under process conditions in step (d) and fatty alcohols, to form a mixture of plastics, wherein the additional component Z is added, relative to the volume of the mixture of A and X, in a quantity of 0.01 to 10%;

(c) forming the mixture of plastics into granular beads of 1 to 5 mm in diameter (d) conveying the granular beads through a conveying device with mechanical mixing, kneading or compression, subjecting along a transport path to a sectional multistage thermal treatment, the multistage thermal treatment comprising three stages, the temperature being in
  i) a first stage 60 to 130° C.,
  ii) a second stage, 130 to 180° C.,
  iii) a third stage, 160 to 380° C., to form a thermally treated mixture; and (e) discharging the thermally treated mixture via a nozzle; and (f) shaping said thermally treated mixture to form a tool part.

* * * * *